United States Patent [19]

Javier

[11] Patent Number: 5,135,121
[45] Date of Patent: Aug. 4, 1992

[54] PRESSURE COOKER
[75] Inventor: Umerez A. Javier, Mondragon, Spain
[73] Assignee: Fagor, S. Coop. Ltda., Mondragon, Spain
[21] Appl. No.: 597,578
[22] Filed: Oct. 15, 1990
[30] Foreign Application Priority Data Oct. 16, 1989 [ES] Spain .................................. 8903049

[51] Int. Cl.⁵ ............................................ B65D 51/16
[52] U.S. Cl. ................................ 220/206; 220/203; 220/316; 220/318; 220/367
[58] Field of Search ............... 220/203, 208, 209, 316, 220/318, 367, 89.1, 206

[56] References Cited
U.S. PATENT DOCUMENTS

| | | | |
|---|---|---|---|
| 2,483,297 | 9/1949 | Naylor | 220/203 |
| 3,973,694 | 8/1976 | Tess | 220/206 |
| 4,251,007 | 2/1981 | Behnisch | 220/316 |
| 4,330,069 | 5/1982 | Bauer | 220/203 |
| 4,534,485 | 8/1985 | Subramanian | 220/203 |
| 4,620,643 | 11/1986 | Sebillotte | 220/316 |
| 4,735,190 | 4/1988 | Fischbach | 126/377 |
| 4,796,777 | 1/1989 | Keller | 220/203 |
| 4,899,782 | 2/1990 | Krejza et al. | 137/523 |
| 4,932,550 | 6/1990 | Moucha | 220/208 |

Primary Examiner—Stephen Marcus
Assistant Examiner—Stephen Cronin
Attorney, Agent, or Firm—Helfgott & Karas

[57] ABSTRACT

A pressure cooker includes a bayonet closure and two complementary handles, one of which is fitted to the body of the cooker, and the other is connected to the lid. The upper handle is provided with a lever for obtaining different degrees of pressure within the cooker. The lever has a groove in which a transversal shaft is received. A fork extending from the transversal shaft has a stepping at each end thereof. A control valve is assembled on the upper handle of the lid of the pressure cooker.

3 Claims, 3 Drawing Sheets

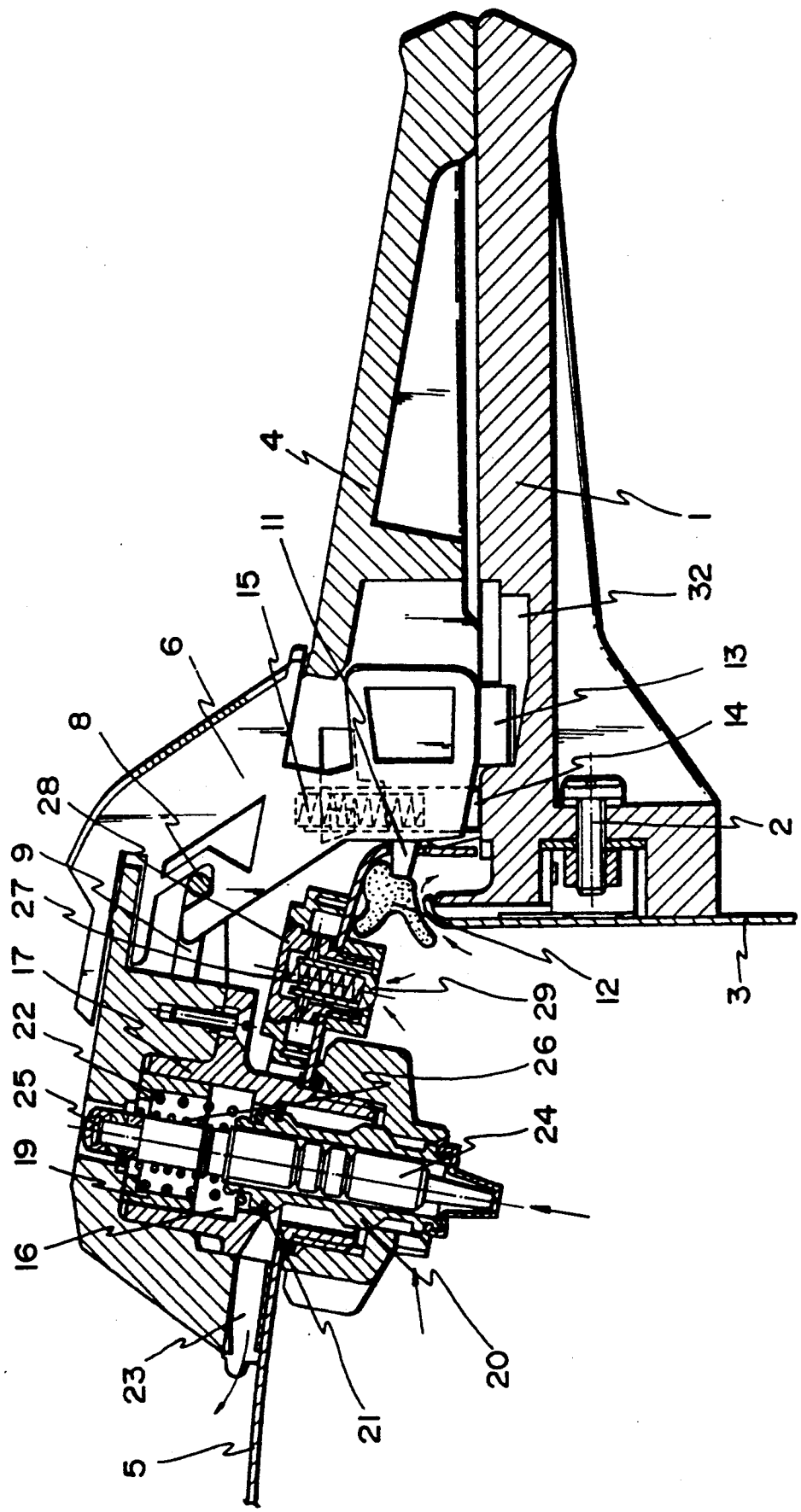

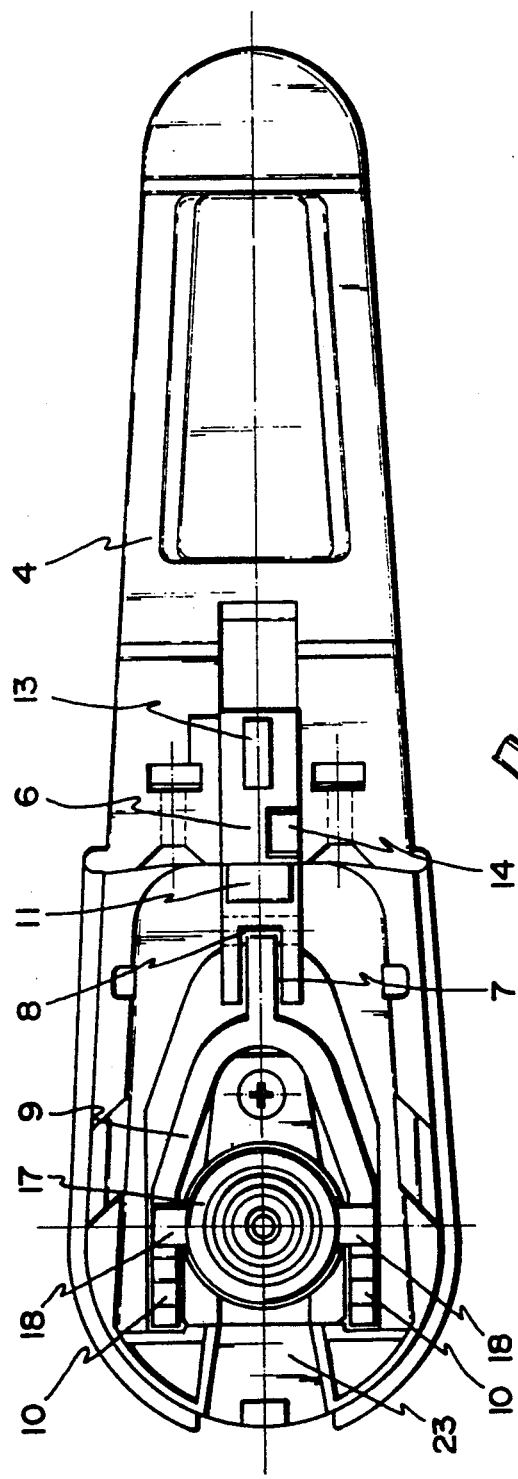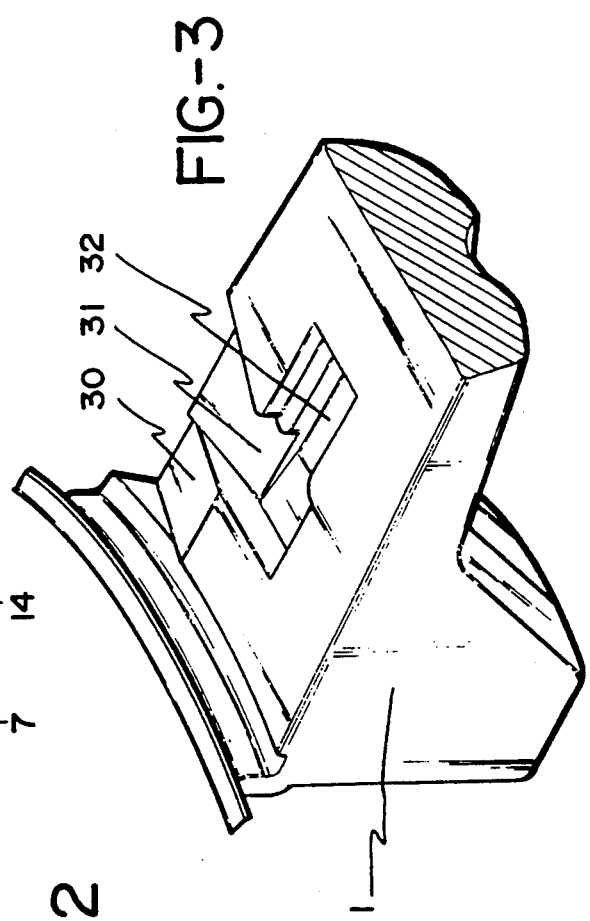

PRESSURE COOKER

FIELD OF THE INVENTION

The instant invention relates to a pressure cooker, specifically of the type provided with a bayonet lock and fitted with a pair of associated handles, one provided on the lid and the other one provided on the cooker body, which may be locked to each other upon closure and unlocked to open the respective lid.

The cooker is provided with a valve regulating and controlling internal pressure, acted upon to allow the gas to leave in the event of excessive pressure, being moreover provided with means, specifically a handle mounted on the lid handle, to establish several working positions under a different pressure for the valve.

It is also fitted with an independent safety valve not provided in other cookers of this type.

BACKGROUND TO THE INVENTION

The assigned of the present application is also the assignee of spanish utility model registrations 276,052 and 278,402, of 1983 and 1984, respectively. These documents respectively disclose a device for regulating and controlling pressure cookers and a locking device for pressure cookers so that the first one claims the actual valve structure and means to operate the same, such means comprising a clevis with axial displacement operated through a cam by means of a drive element provided on the respective lid handle so that it is possible to adjust a greater or lesser pressure that the valve must withstand through such clevis.

The second case, i.e., utility model 278,402, specifically claimed the means to lock both cooker handles, when closing the same.

Although the characteristics claimed in those two utility models duly fulfil their purpose, it is very true that in utility model 276,052 both the locking elements and the elements to operate the clevis that become involved in valve adjustment are complex and require considerable assembly time within the cooker as a whole and of course entail a high manufacturing cost.

As to the locking device claimed in my principal's second utility model, 278,402, though simple, it requires the assistance of a cam to fulfil its function.

SUMMARY OF THE INVENTION

The pressure cooker subject hereof relies upon a regulating and controlling device and locking means to close the relevant lid in bayonet type pressure cookers, but is also provided with a series of modifications or improvements that result in the same number of functional, structural and, not least, economical advantages, doubtlessly affording services that no other cookers of this type render, not even those described as background to the invention.

More specifically, the improvements of the pressure cooker of the invention are first of all reside in the way to operate the clevis, and the respective manually operated handle through which the clevis is specifically operated. Another improvement lies in the locking means to close the lid, in other words, the connection between such lid handle and the cooker body handle, in order to lock the lid and cooker body together.

Another improvement lies in the fact that the cooker is also provided, on its lid, with a safety valve to assist the valve.

Another improvement lies in that the valve, based on a piston with some seats, is complemented by a rod housed within the cylindrical body forming the valve piston, and partially projecting above the same, the free or upper end of such rod being provided with rings of different colors indicating a greater or lesser degree of pressure within the cooker, for which purpose such rod may be displaced upwards precisely by a greater or lesser internal cooker pressure.

All these improvements and others that shall be set forth throughout this specification result in a cooker that, albeit of a type known per se, so far as general structure thereof and moreover based on certain characteristics so far as valves and locking means are concerned, provided in other cookers whose mechanisms are also registered by the applicant firm, fully overcomes such problems and disadvantages set forth hereinbefore, and because of this the valve subject of the invention has been tested with optimum performance, as well as high safety and in short with unsurpassable results.

BRIEF DESCRIPTION OF THE DRAWINGS

In order to provide a fuller description and contribute to the complete understanding of the characteristics of this invention, a set of drawings is attached to the specification which, while purely illustrative and not fully comprehensive, shows the following:

FIG. 1 is a sectional elevation view of a general mechanism for regulating and controlling the pressure cooker, which mechanism is provided with the relevant valve, the additional safety valve and the mechanical operating means, all provided in the assembly formed by the lid handle and associated cooker body handles;

FIG. 2 is a plan view of the bottom surface of the lid handle with the elements provided therein, namely valve, operating clevis and handle operating such clevis and including the locking means for closing the cooker;

FIG. 3 is a top perspective view of a portion of the cooker body handle, showing inclines and stepping involved in the respective locking for closing the cooker, which locking will logically be effected with the assistance of the lid handle to fix the latter upon closure;

DETAILED DESCRIPTION OF THE PREFERRED EMBODIMENT OF THE INVENTION

Figure 5:
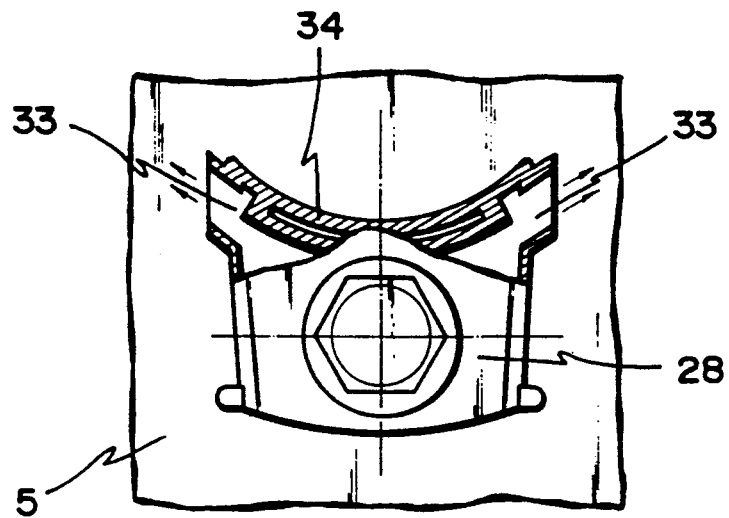
FIG. 5 shows a plan view with a cut-away portion of the safety valve provided in the cooker's lid, which valve is not associated to the aforesaid regulating and control valve.

In the light of drawings, the pressure cooker being of the type fitted with a bayonet type lock, and for which only the parts corresponding to the two associated handles fixed to the cooker body and the lid as such have been illustrated, the cooker comprises a first handle (1), duly screwed by means of internal screws (2) to the cooker body (3), whereas number (4) indicates the associated handle likewise screwed by means of hidden screws to the lid (5).

Figure 4:
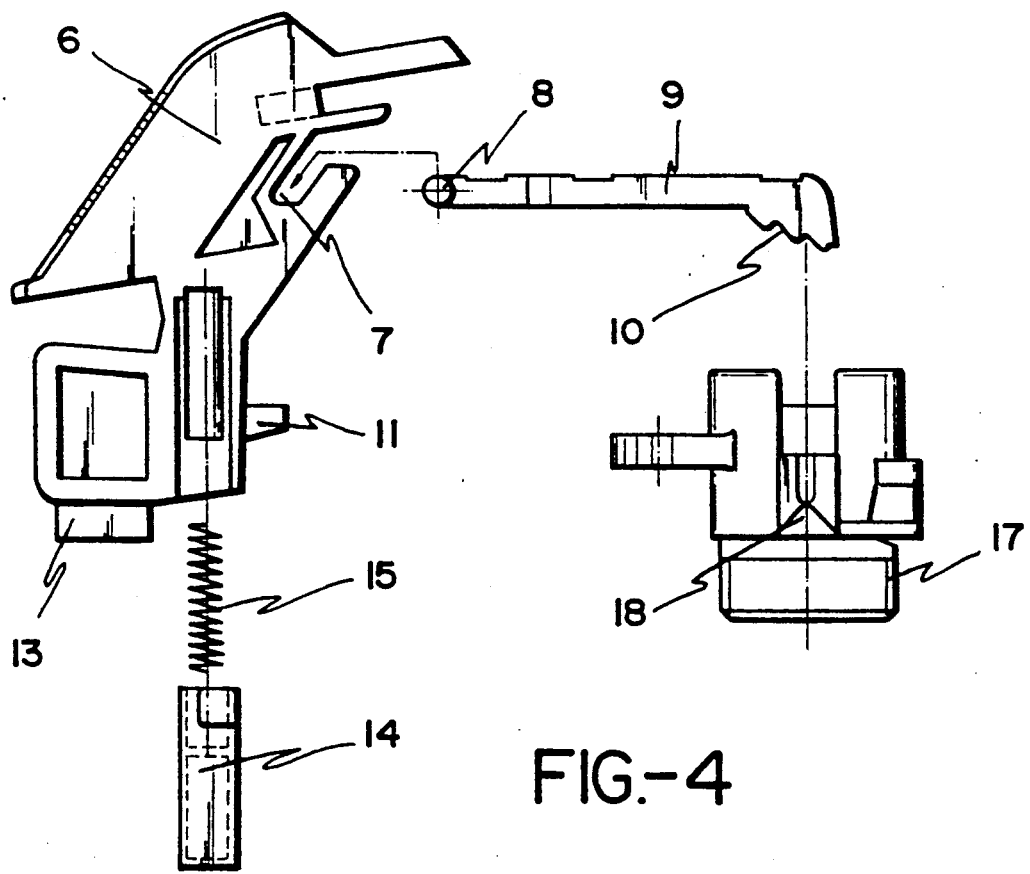
FIG. 4 is an exploded side elevation view of the constituent parts of the handle for operating the relevant clevis that in turn act upon a bushing assisting in the adjustment of the cooker valve.

The lid's top handle (4) is provided with a manually and externally operated handle or lever (6) which can move in its emplacement with regard to the handle (4)

to attain different degrees of cooker pressure; lever or handle (6) is, on the one hand, provided with a groove (7) (see FIG. 4) housing a transverse shaft (8) which branches into a fork or clevis (9) whose ends each provide a stepping (10) whose function shall be explained hereinafter.

Facing the groove (7) of lever (6) there is provided an inward projection (11), whose function is to act upon the respective perimetric joint (12) provided between the lid (5) and the cooker body (3), so that the projection's (11) thrust causes the joint (12) to be deformed and will in short cause a small aperture to be opened to allow outlet of gases at the start, i.e., before proceeding to open the cooker, as shown in FIG. 1.

At a right angle to projection (11), there is another projection (13) on lever (6) that with the assistance of a small retractable protuberance (14), by action of a spring (15), acts as locking means when closing the cooker, as shall likewise be explained hereinafter.

The lid handle (4) is fitted with the respective regulating and control valve (16) which comprises a hollow cylindrical body (17) housed within a hole in handle (4), and whose tubular body (17) is screwed by means of one screw and its side is provided with two axial windows through which the same number of radial fins (18) pass, such fins forming part of an internal bushing (19) that can move up and down with regard to the body (17) that makes up the general valve support, the valve further comprising a piston (20) with perimetric steppings associated with others provided on the support body (17), so that by means of a joint (21) precisely provided on one of the steppings thereof, the valve is closed when there is no pressure inside the cooker, whereas when pressure is present, it pushes such piston (20) against a spring (22) and the joint (21), moving up, will permit internal communication with an outlet (23) precisely provided on the front of handle (4), i.e., between the latter and the actual external surface of the lid (5), as also clearly shown in FIG. 1.

The piston (20) that makes up the valve houses a rod (24) whose upper end is provided with rings (25) of different color, that can be visible to the outside when the pressure inside the cooker pushes such rod (24) against the action a spring (26). The rings will indicate different degrees of pressure inside the cooker, according to their color, when they become visible above the actual handle (4).

The valve is assisted by a safety valve (27) provided on the actual lid (5), which valve has an internal nut (28) and a rod (29) that can move against the action of a spring, by means of the internal cooker pressure.

Valve adjustment is determined by the position of handle (6) so that displacement of handle (6) in either direction implies that the corresponding clevis (9), when moving axially, will drag up or down with it the radial fins or strips (18) of the internal bushing (19) in such a way that the latter represents a more or less internal seat for the spring (22) and in short to attain a higher or lower valve pressure adjustment, so that the steppings (10) provided on the ends of clevis (9) actually cause a greater or lesser displacement of the bushing (19) in either direction.

As seen from FIG. 3, the lower handle (1) of the cooker body, and specifically its top surface facing the bottom surface of handle (4), is provided with a side ramp (30), a likewise side recess (31), its innermost part leading into an axial and deeper slot (32), so that when both handles (1) and (4) face each other as shown in FIG. 1, the retractable protuberance (14) provided on the lever (6) slides on ramp (30) and projection (13) of lever (6) is located and slides through the slot (31), all of this when the lid is placed on the cooker and is to be closed by duly turning the same.

Once both handles (1) and (4) are facing each other in such closure, to attain the locking it will be necessary to act on the lever (6), moving the same backwards for the projection (13) to be housed in the deeper slot (32), locking rotation of handle (4) of the lid with regard to handle (1) of the cooker, thus locking the closure, and moreover according to the position of the lever (6) displaced backward to a greater or lesser extent, an adjustment of greater or lesser pressure will have been attained for the valve as a whole.

To open, it will suffice to move the lever (6) forward as far as possible, for the projection (13) to face the slot (31) and thus allowing the handle to rotate together with its lid (5) to open the same.

Finally, and going back to the safety valve (27) shown in a plan and partially cut away view in FIG. 5, the same, upon displacement of its rod (29) against an overpressure in the cooker, allows the vapor to come out in due time through outlets (33) provided on the external casing of valve (27) and the actual external surface of the lid (5), for such safety valve (28) is precisely assembled on the lid (5) and close to the area where the previously described regulating and control valve is located.

It is believed that the device has now been sufficiently described for any expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. In a pressure cooker of the type provided with a bayonet lock and comprising a cooker body; a lid; two respective handles which are locked to each other upon closure of the cooker, one handle being attached to the lid and another handle being attached to the cooker body, the lid carrying a valve for regulating and controlling an internal pressure of the cooker; an external lever provided on top of said one handle; a clevis operatively connected to said external lever; said valve including a hollow piston which can move against a spring and is adjustable by action of said clevis acting on a bushing which may move towards or away from said piston during displacement thereof, said clevis being operated by said external lever, said external lever being operated to take up different positions in one of which the cooker can be opened, whereas in other positions of said external lever a greater or lesser pressure is determined to operate said valve according to an internal pressure in the cooker, said hollow piston accommodating a rod having a lower end which is under the internal pressure in the cooker and an upper end, which when said rod moves, projects outside said one handle, said upper end having rings, the improvement comprising said external lever having a groove, said clevis including a transverse shaft received in said groove, said external lever being provided with a locking projection and a spring-biased retractable protuberance which assists said locking projection upon closure of the lid, and said rings being of different colors and becoming visible to indicate different degrees of pressure inside the cooker according to colors thereof.

2. The pressure cooker according to claim 1, wherein said external lever is manually operated and wherein said retractable protuberance and said locking projection are provided on a lower and internal end of said external ever and are positioned so that said retractable protuberance, in a position when said lever faces said another handle, slides on a ramp provided on an upper surface of said another handle whereas said locking projection becomes positioned in and slides within a recess provided in a top area of said another handle, said recess merging into a deeper slot extending axially of said another handle, said deeper slot receiving said lacking projection when said external lever is moved towards any position other than an open position of the cooker.

3. The pressure cooker according to claim 1, wherein said lid is provided, close to an area where said regulating and control valve is positioned, with a safety valve including a casing mounted to an external surface of said lid, said safety valve being positioned substantially under said external lever when the cooker in a closed position, said casing being provided with deformations to form vapor outlets between said casing and the external surface of said lid on which said safety valve is mounted.

* * * * *